United States Patent [19]

Mrowca

[11] 3,876,672
[45] Apr. 8, 1975

[54] HYDROFORMYLATION OF OLEFINS
[75] Inventor: Joseph J. Mrowca, Wilmington, Del.
[73] Assignee: E. I. du Pont de Nemours and Company, Wilmington, Del.
[22] Filed: Feb. 21, 1972
[21] Appl. No.: 334,409

[52] U.S. Cl......... 260/410.9 R; 260/413; 260/465.1; 260/465.6; 260/464; 260/483; 260/484 R; 260/491; 260/592; 260/593 R; 260/594; 260/599; 260/598; 260/600; 260/602; 260/604 HF; 260/613 D; 260/615 R; 260/617 R; 260/618 R; 260/618 D; 260/631 R; 260/632 HF
[51] Int. Cl..................... C07c 45/10; C07c 26/16
[58] Field of Search 260/604 HF, 632 HF, 410.9 R, 260/483

[56] References Cited
UNITED STATES PATENTS

| | | | |
|---|---|---|---|
| 3,239,571 | 3/1966 | Slaugh et al. | 260/632 |
| 3,631,111 | 12/1971 | Tucci | 260/604 HF |
| 3,641,076 | 2/1972 | Booth | 260/429 R |
| 3,660,493 | 5/1972 | Johnson et al. | 260/604 HF |

*Primary Examiner*—Lewis Gotts
*Assistant Examiner*—Diana G. Rivers

[57] ABSTRACT

Olefins add hydrogen and carbon monoxide to form aldehydes and alcohols at 25°–200°C and 1 to 1000 atmospheres pressure in the presence of a cationic hydride of nickel, palladium or platinum complexed with 2–4 organophosphorus ligands.

6 Claims, No Drawings

HYDROFORMYLATION OF OLEFINS

BACKGROUND OF THE INVENTION

1. Field of the Invention

This invention relates to an improved method of making aldehydes and alcohols from organic compounds containing aliphatic unsaturation. More particularly, it relates to a method of making largely linear aldehydes and alcohols by catalytic addition of carbon monoxide and hydrogen across olefinic unsaturation (hydroformylation).

2. The Prior Art

Hydroformylation is an old reaction and is used commercially to prepare both straight and branched chain aldehydes. Cobalt carbonyl is the catalyst normally used for these reactions, but large quantities of branched chain products are formed together with the straight chain aldehydes. Rhodium carbonyl complexes containing tertiary phosphine or phosphite ligands [Evans et al., J. Chem. Soc. A, 3133 (1968); Pruett and Smith, J. Org. Chem., 34, 327 (1969)] are useful at low pressures and give higher ratios of straight chain to branched chain products. Similar cobalt carbonyl complexes [Slaugh and Mullineaux, J. Organometal. Chem., 13, 469 (1968)] also give more straight chain product, but produce alcohols as the primary products. Nickel carbonyl shows low catalyst efficiencies [Gresham and Brooks, U.S. Pat. No. 2,497,303 (1950)]. Certain organic polymers having associated with them cobalt, rhodium, platinum or palladium metals [Kahle and Cleary, U.S. Pat. No. 3,652,676 (1972)] are catalysts for hydroformylation, but about equal amounts of straight chain and branched chain products are obtained.

SUMMARY OF THE INVENTION

The present invention is a process of hydroformylation of a compound having at least one active ethylenic group, and preferably not more than 30 carbon atoms subject to the following provisos:

i. at least two hydrogen atoms are attached to the unsaturated carbon atoms of each active ethylenic group;
ii. the active ethylenic groups are not conjugated with other aliphatic unsaturation;
iii. halogen or hydroxyl must be removed by at least two carbon atoms from the active ethylenic group;
iv. internal active ethylenic groups have the cis configuration;
v. the compound is free of amine groups;

which comprises:

contacting the compound with carbon monoxide and hydrogen at a pressure of 1 to 1000 atmospheres and at a temperature of 25°–200° C with a catalyst of the formula $$L_nMH^+X^-$$

wherein $n$ is 2, 3, or 4;
M is nickel, palladium or platinum;
L is a trivalent organophosphorus ligand,
$R_3P$, where the R substituents, alike or different, are lower alkyl, cycloalkyl, of 3–8 carbon atoms, lower alkoxy; aryl, aryloxy, arylthio and aralkyl groups, each of up to 12 carbon atoms and the aryl groups of aryl, aralkyl, aryloxy and arylthio being substituted with up to three halogen atoms or lower alkoxy groups; lower alkylthio, di(lower alkyl)amino, pyrrolidino, piperidino and vinyl groups.

Preferred organophosphorus ligands include trialkylphosphines, triarylphosphines and triaryl phosphites. Especially preferred ligands are triethylphosphine, tributylphosphine, triphenylphosphine and triphenyl phosphite.

X is an anion of low coordinating ability and includes such anions as hexafluorophosphate, bisulfate, acetate, trifluoroacetate, hexafluoroantimonate, hexachloroantimonate, tetrafluoroborate, hexachlorostannate, benzene sulfonate, methane sulfonate and trifluoromethane sulfonate. Preferred anions are hexafluorophosphate, bisulfate, and trifluoroacetate.

DETAILED DESCRIPTION OF THE INVENTION

The hydroformylation reaction is illustrated by the following reaction scheme:

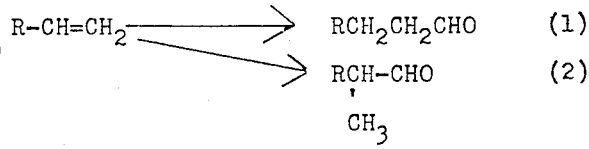

The resultant aldehydes (1) and (2) may be further reduced to alcohols. The novel catalyst system of the present invention promotes the formation of linear products of the type (1) when the aldehyde group is attached to a terminal olefinic group, i.e., a vinyl group or a vinylidene group, $RRC=CH_2$, as illustrated hereinabove. The reaction is also applicable to compounds containing cis-vinylene groups, although linear products are not obtained.

The hydroformylation reaction is applicable to a wide variety of unsaturated compounds, including compounds containing more than one ethylenic group. Since difficulty has been experienced where the ethylenic unsaturation is highly branched, two substituents of the olefinic group should be hydrogen. Hydroxyl or halogen substituents must be removed from the double bond by at least two carbon atoms. Difficulty has also been encountered with compounds in which two or more aliphatically unsaturated groups are conjugated, where amine substituents are present, or where internal double bonds have a trans configuration.

Substituents which do not interfere with the reaction of the invention include lower acyl of 2–6 carbon atoms, aroyl, aryl, cyano, carboxyl, lower alkoxycarbonyl, aralkyl, lower alkaryl, lower alkoxy and aryloxy. Halogen including fluorine, chlorine, bromine and iodine and hydroxyl substituents can also be present subject to the proviso noted above. Aryl groups present may also be substituted by any of the other non-interfering substituents.

The preferred unsaturated compounds are hydrocarbons or hydrocarbons substituted with the above substituents which hydrocarbons contain at least one group of

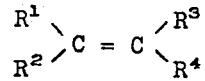

wherein at least two of the $R^1$, $R^2$, $R^3$, and $R^4$ are hydrogen, $R^1$ to $R^4$ are hydrogen or aliphatically saturated hydrocarbyl radicals, and any two of $R^1$, $R^2$, $R^3$, and $R^4$ can be joined to form a ring of 3–12 carbon atoms.

When more than one unsaturated group is present in the molecule, then at least one of $R^1$ to $R^4$ will be a common, linking radical. Any internal double bonds will have a cis configuration. Preferably the unsaturated compounds contain up to 30 carbon atoms.

Preferred unsaturated compounds for the practice of this invention contain at least one vinyl group and include:

| | | |
|---|---|---|
| Ethylene | Tridecene-1 | 4-Vinylcyclohexene |
| Propylene | Tetradecene-1 | Methyl 10-undecenoate |
| Butene-1 | Nonadecene-1 | Ethyl 10-undecenoate |
| Pentene-1 | Docosene-1 | 10-Undecenoic acid |
| Hexene-1 | 1,5-Hexadiene | Pentadecene-1 |
| Heptene-1 | 1,6-Heptadiene | Hexadecene-1 |
| Octene-1 | 1,7-Octadiene | Heptadecene-1 |
| Nonene-1 | 1,8-Nonadiene | Octadecene-1 |
| Decene-1 | 1,9-Decadiene | 10-Undecen-1-ol |
| Undecene-1 | 1,10-Undecadiene | 5-Hexen-2-one |
| Dodecene-1 | 1,11-Dodecadiene | 5-Hexenenitrile |

3,4-Dimethylhexene-1
4,4-Dimethylhexene-1
5,5-Dimethylhexene-1
2-Methyl-3-ethylpentene-1
Cyclopentene
Cyclohexene
Cycloheptene
Cyclooctene
Cyclononene
cis-Pentene-2
cis-4-Methyloctene-2
cis-4,6-Dimethyloctene-2
cis-4-Methylheptene-2
cis-2-Ethylhexene-3
cis-Heptene-2
Allyl acetate
cis-$C_2H_5O_2CCH_2CH=CHCH_3$
$C_6H_5COCH_2CH=CH_2$
α-Methylstyrene
4-Chlorocyclohexene
1-Vinylnaphthalene
cis-1,4-Diphenyl-2-butene
3-Bromostyrene
2-Fluorostyrene 2-Methylnonadecene-1
Eicosene-1
Cyclodecene
Cyclododecene
Cycloocta-1,5-diene
cis-Butene-2
cis-Hexene-2
cis-Hexene-3
cis-Octene-2
cis-Octene-4
cis-Octene-3
cis-Nonene-2
cis-5-Methyloctene-2
cis-2-Methylhexene-3
5-Methoxy-1-pentene
3-Cyclohexene-1-carbonitrile
$CH_3COCH_2CH=CH_2$
p-$ClC_6H_4CH_2CH=CH_2$
Methylenecyclohexane
p-$CH_3OC_6H_4CH=CH_2$
$C_6H_5CH_2CH_2CH=CH_2$
4-Chloro-1-methylenecyclohexane
2,4-Dichlorostyrene
3-Fluorostyrene

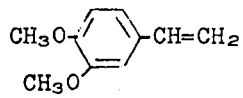 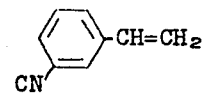

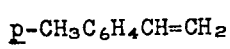

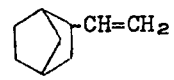

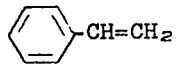 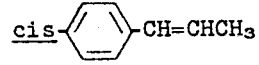 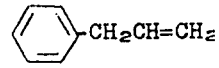

 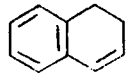 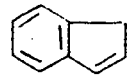

 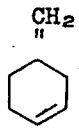 

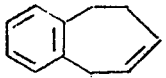 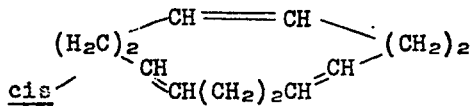

Other unsaturated compounds that can be used in this invention include:

| | |
|---|---|
| Isobutylene | 3-Methylbutene-1 |
| 2-Methylbutene-1 | 2-Methylpentene-1 |
| 4-Methylpentene-1 | 2,3,3-Trimethylpentene-1 |
| 2,3-Dimethylbutene-1 | 2,4,4-Trimethylpentene-1 |
| 3,3-Dimethylbutene-1 | 3,4,4-Trimethylpentene-1 |
| 2-Methylhexene-1 | 2-Methyloctene-1 |
| 3-Methylhexene-1 | 7-Methyloctene-1 |
| 4-Methylhexene-1 | 2,6-Dimethylheptene-1 |
| 3-Ethylpentene-1 | 4,4-Dimethylheptene-1 |
| 2,3-Dimethylpentene-1 | 4-Methyl-4-ethylhexene-1 |
| 3,3-Dimethylpentene-1 | 4,4,5-Trimethylhexene-1 |
| 2,3,3-Trimethylbutene-1 | 3,7-Dimethyloctene-1 |
| 2-Methylheptene-1 | 2,5,6-Trimethylheptene-1 |
| 4-Methylheptene-1 | 2,3-Dimethyloctene-1 |
| 4-Ethylhexene-1 | 3-Butyloctene-1 |
| 2,3-Dimethylhexene-1 | 3-Propylnonene-1 |
| 2,5-Dimethylhexene-1 | 3,7,11-Trimethyldodecene-1 |

Preferred classes include:

1. 1-alkenes of the formula, $H(CH_2)_pCH=CH_2$, where $p$ is 0–28;

2. diolefins of the formula, $CH_2=CH(CH_2)_qCH=CH_2$, where $q$ is 1–26;

3. esters of the formula, (lower alkyl)—$OCO(CH_2)_rCH=CH_2$, where $r$ is 0–21. In especially preferred classes, $r$ is no greater than 14.

The catalysts employed in the practice of this invention are cationic hydrides of nickel, palladium or platinum. The catalyst is normally employed in a ratio of about 0.01–100 mmoles of catalyst/mole of unsaturated reactant, preferably 0.1–20 mmoles catalyst/mole of reactant.

The catalysts can be prepared by any one of several methods:

Where
$m = 4, z = 0, 1, 2;$
$m = 3, z = 0, 1;$
$m = 2, z = 0.$

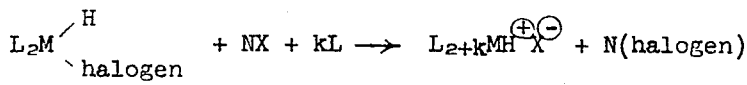

$N = $ Li, Na, K or Ag;
$k = 0, 1.$

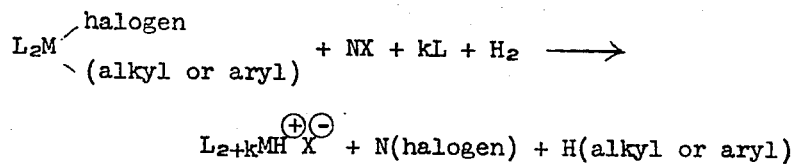

The number of ligands, L, present on any particular catalyst depends on the steric and electronic properties of the ligand. For a discussion of these effects with nickel complexes see Tolman, J. Am. Chem. Soc., 92, 2956 (1970). The preformed catalyst may be added to the hydroformylation reaction directly, or the catalyst may be prepared in situ by any of the above reactions.

The following references describe the preparation of typical cationic hydride catalysts of this invention:
1. F. Cariati, R. Ugo, and F. Bonati, Inorg. Chem., 5, 1128 (1968).
2. W. C. Drinkard, D. R. Eaton, J. P. Jesson and R. V. Lindsey, Inorg. Chem., 9, 392 (1970).
3. M. J. Church and M. J. Mays, J. Chem. Soc. (A), 1968, 3074.
4. D. H. Gerlach, A. R. Kane, G. W. Parshall, J. P. Jesson, and E. L. Muetterties, J. Am. Chem. Soc., 93, 3543 (1971).
5. H. C. Clark and K. R. Dixon, J. Am. Chem. Soc., 91, 596 (1969).
6. H. C. Clark and H. Kurosawa, J. Organometal. Chem., 36, 399 (1972).

Attached to each metal atom of the catalyst are at least two trivalent organophosphorus ligands, $R_3P$, where the R substituents, alike or different, are selected from those listed above.

Examples of suitable ligands, $R_3P$, include:

Trimethylphosphine
Tri-n-butylphosphine
Dimethylphenylphosphine
Diethylphenylphosphine
Methyldiphenylphosphine
Ethyldiphenylphosphine
Tricyclohexylphosphine
Diethyl-p-chlorophenyl-phosphine
Diphenyl-p-bromophenyl-phosphine
Diisopropyl benzene-phosphonite
Diphenyl-N,N-dimethyl-aminophosphine
Hexyldiphenylphosphine
Triphenylphosphine
Tri-p-tolylphosphine
Tri-m-tolylphosphine
Tri-o-tolylphosphine
Dimethylethylphosphine
Dimethyl-p-methoxyphenyl-phosphine
Tris(methylcyclopropyl)-phosphine
Diphenyl-2-naphthylphosphine
Diphenylvinylphosphine
Diphenyl phenylphosphonite
Diphenyl-N-piperidinyl-phosphine
Diphenylbenzylphosphine
Ethyl diphenylphosphinite
Dimethyl phenylphosphonite
Methyl diphenylthiophosphinite
Phenyl diphenylthiophosphinite
Trimethyl phosphite
Triphenyl phosphite
Tri-m-tolyl phosphite
Diphenyl-N-pyrrolidinyl-phosphine
Methyl diphenylphosphinite
Phenyl diphenylphosphinite
Diethyl phenylphosphonite
Ethyl diphenylthiophosphinite
Tris(4-biphenylyl)phosphine
Triethyl phosphite
Tri-p-tolyl phosphite
Tri-o-tolyl phosphite In the context of this invention, an aryl group is defined as a radical derived from a hydrocarbon containing at least one six-membered aromatic ring by removal of a hydrogen directly attached to a carbon atom of such ring. As thus defined, aryl radicals include such species as phenyl groups substituted with alkyl groups.

The term "aralkyl" refers to a radical derived from an aromatic hydrocarbon having at least one alkyl substituent by removal of an aliphatic hydrogen atom.

The term "lower alkoxy" refers to alkoxy radicals having from 1–6 carbon atoms.

The term "cycloalkyl" refers to a radical derived from a saturated alicyclic compound by removal of a hydrogen atom.

The term "lower alkyl" refers to radicals derived from an aliphatic hydrocarbon having from 1–6 carbon atoms, by removal of a hydrogen atom.

Temperature

The hydroformylation reaction is carried out by heating the olefin, carbon monoxide, hydrogen, catalyst, and optionally a solvent at temperatures of 25°–200° C, preferably 100°–160° C.

Pressure

While total pressures of hydrogen and carbon monoxide of 1–1,000 atmospheres can be used in practicing this invention, it is preferred to employ total pressures in the range of 50–200 atmospheres.

Hydrogen/Carbon Monoxide Molar Ratios

In the hydroformylation of an olefin to obtain an aldehyde, one mole of hydrogen and one mole of carbon monoxide are required for each mole of carbon-carbon unsaturation to effect complete reaction. Nevertheless, it is possible to effect the reaction over a molar range of $H_2$ to CO of 0.5–10/1. However, it is preferred to operate within a molar ratio of 1–2 moles of hydrogen per mole of carbon monoxide. Increasing the ratio of $H_2$ to CO increases the amount of alcohol formed.

Solvents

The reaction may be run with or without a solvent. Suitable solvents include aldehydes, alcohols, ethers, esters, ketones, nitriles, aromatic hydrocarbons, aliphatic hydrocarbons, and chlorocarbons. Examples of such solvents are tetrahydrofuran, dibutyl ether, diethyl ether, dioxane, 2-methoxyethyl ether, 1,2-dimethoxyethane, butyl alcohol, ethyl alcohol, ethylene glycol, isobutyl alcohol, n-butyraldehyde, ethyl acetate, amyl acetate, ethyl butyrate, methyl benzoate, acetone, methyl ethyl ketone, methyl isobutyl ketone, acetonitrile, propionitrile, benzonitrile, chloroform, ethylene dichloride, methylene chloride, chlorobenzene, the chlorotoluenes, benzene, toluene, the xylenes, hexane, heptane, octane, cyclohexane, and methylcyclohexane.

Reactors

Reactors used in this invention are not critical as long as they are able to withstand the temperatures and pressures involved. Pressure vessels of high tensile steel are generally used and they may be either lined or unlined. Suitable reactor liners include Hastelloy metals, stainless steel, silver, aluminum, copper, glass and glazed ceramics.

The process of this invention can be readily carried out using well-known chemical engineering practice which includes continuous, semi-continuous and batch operation.

The reactions are carried out by charging the olefin, if liquid or solid, the cationic hydride metal catalyst, or its precursor, and the solvent into a suitable pressure-resistant vessel. For laboratory work, a shaker or rocker system is convenient for agitating the reactants and effecting intimate contact.

The charged reactor is closed, chilled in Dry Ice, evacuated to remove air, and placed in a shaker or rocker. Olefin, if gaseous, is then added and the system connected to supplies of carbon monoxide and hydrogen. A sufficient quantity of each gas is added to give the desired molar ratio of hydrogen to carbon monoxide and the desired pressure at the chosen reaction temperature.

The system is then heated under agitation until reaction is complete. As the reaction proceeds, more hydrogen and carbon monoxide can be added periodically to maintain the pressure in the desired range. The course of the reaction is readily followed by observation of the drop in pressure. The product or products can be removed from the reaction mixture by conventional methods of isolation such as distillation.

EMBODIMENTS OF THE INVENTION

The following examples illustrate specific embodiments of the invention. The conversions reported are calculated by the formula:

$$\% \text{ conversion} = \frac{\text{moles olefin consumed}}{\text{moles olefin charged}} \times 100$$

Similarly, the $$\text{``\% linear isomer''} = \frac{\text{moles linear aldehyde (alcohol)}}{\text{moles total aldehyde (alcohol)}} \times 100$$

The amounts of total aldehyde and alcohol formed were determined by gas-liquid partition chromatography (glc) on a ¼ inch × 4 foot column of GE Nitrile Silicone Gum (XE60) on 60–80 mesh diatomite support. The column was programmed from 80°–200° C at 6°/minute.

EXAMPLE 1

A 10-ml Hastelloy C (Union Carbide Corp.) lined shaker tube was charged with 2 g of 1-hexene, 3 ml of tetrahydrofuran (THF) and 0.2 g of hydridotris(triphenylphosphine)platinum(II) bisulfate. The tube was cooled to −78° C, evacuated, and then heated at 150° C for 2 hours under 1500 lbs/in² gauge pressure (psig) of a 1:1 mixture of hydrogen/carbon monoxide. The tube was cooled and the reaction mixture analyzed. A glc analysis showed a 4% conversion of 1-hexene to a mixture of products containing 88% of $C_7$ aldehydes and 12% of $C_7$ alcohols. The $C_7$ aldehydes contained 92% of the linear isomer, n-heptaldehyde, and 8% of the branched isomer, 2-methylhexaldehyde. The $C_7$ alcohols contained essentially 100% of the linear isomer, n-heptanol, with a trace of the branched product.

EXAMPLE 2

Following the procedure of Example 1, a mixture of 1 g of 1,9-decadiene, 2 ml of 1,2-dimethoxyethane, and 0.2 g of hydridotris(triethylphosphine)platinum(II) hexafluorophosphate was heated at 150° C for 3 hours under 1,500 psig pressure of 1:1 $H_2/CO$. A glc analysis of the resulting reaction mixture showed a 44% conversion of 1,9-decadiene to give two products with retention times corresponding to $C_{11}$ monoaldehydes. Volatiles were removed from the mixture at reduced pressure, and an infrared spectrum of the residue showed a strong aldehyde absorption, $\nu_{C=O}$, at 1,740 cm$^{-1}$, and a weak aldehyde absorption $\nu_{C-H}$, at 2,750 cm$^{-1}$.

EXAMPLE 3

Following the procedure of Example 1, a mixture of 2 g of 1-nonene, 2 ml of tetrahydrofuran, and 0.1 g of hydridotris(triphenylphosphine)platinum(II) bisulfate was heated at 150° C for 2 hours under 1500 psig pressure of 1:1 $H_2/CO$. A glc analysis of the resulting reaction mixture showed a 2% conversion of 1-nonene to a mixture of $C_{10}$ aldehydes which contained 92% of the linear isomer, n-decylaldehyde, and 8% of the branched isomer, 2-methyl-n-nonylaldehyde.

EXAMPLE 4

Following the procedure of Example 1, a mixture of 2 g of allylbenzene, 2 ml of tetrahydrofuran, and 0.2 g of hydridotris(triethylphosphine)platinum(II) hexafluorophosphate was heated at 150° C for 2 hours under 1,500 psig pressure of 1:1 $H_2/CO$. A glc analysis of the resulting reaction mixture showed an 18% conversion of allylbenzene to a mixture of aldehydes containing 88% of the linear isomer, γ-phenylbutyraldehyde, and 12% of the branched isomer, 1-methyl-2-phenylpropionaldehyde. Volatiles were removed from the reaction mixture at reduced pressure and an infrared spectrum of the residue showed a strong aldehyde band, $\nu_{C=O}$, at 1,725 cm$^{-1}$ and a weak aldehyde band, $\nu_{C-H}$, at 2,700 cm$^{-1}$.

EXAMPLE 5

Following the procedure of Example 1, a mixture of 2 g of cyclooctene, 2 ml of tetrahydrofuran, and 0.2 g of hydridotris(triethylphosphine)platinum(II) hexafluorophosphate was heated at 150° C for 3 hours under 1500 psig pressure of 1:1 $H_2/CO$. A glc analysis of the resulting reaction mixture showed a 2% conversion of cyclooctene to cyclooctanecarboxaldehyde as the only product. Volatiles were removed from the reaction mixture under reduced pressure and an infrared spectrum of the residue showed an aldehyde band, $\nu_{C=O}$, at ca. 1,730 cm$^{-1}$ and an aldehyde band, $\nu_{C-H}$, at ca. 2,720 cm$^{-1}$.

EXAMPLE 6

Following the procedure of Example 1, a mixture of 2 g of 6-chloro-1-hexene, 2 ml of tetrahydrofuran, and 0.2 g of hydridotris(triethylphosphine)platinum(II) hexafluorophosphate was heated at 150° C for 2 hours under 1,500 psig pressure of 1:1 $H_2/CO$. A glc analysis of the resulting reaction mixture showed an 18% conversion of 6-chloro-1-hexene to a mixture of aldehydes containing 96% of the linear isomer, $Cl(CH_2)_6CHO$ and 4% of the branched isomer, $Cl(CH_2)_4CH(CH_3)CHO$. Volatiles were removed from the mixture at reduced pressure and an infrared spectrum of the residue showed a strong aldehyde band, $\nu_{C=O}$, at ca. 1,730 cm$^{-1}$, and a weak aldehyde band, $\nu_{C-H}$, at ca. 2,750 cm$^{-1}$.

EXAMPLE 7

Following the procedure of Example 1, a mixture of 2 g of cis-3-hexene, 2 ml of tetrahydrofuran, and 0.1 g of hydridotris(triethylphosphine)platinum(II) hexafluorophosphate was heated at 150° C for 5 hours under 1500 psig pressure of 1:1 $H_2/CO$. A glc analysis of the reaction mixture showed a 24% conversion of cis-3-hexene to 2-ethyl-n-pentaldehyde. Volatiles were removed from the mixture under vacuum, and an infrared spectrum of the residue showed a strong aldehyde band, $\nu_{C=O}$, at ca. 1,730 cm$^{-1}$ and a weak aldehyde band, $\nu_{C-H}$, at ca. 2,750 cm$^{-1}$.

EXAMPLE 8

Following the procedure of Example 1, a mixture of 2 g of methyl 10-undecenoate, 2 ml of acetone, and 0.15 g of hydridotris(triethylphosphine)platinum(II) hexafluorophosphate was heated at 150° C for 5 hours under 1,500 psig pressure of 1:1 $H_2/CO$. A glc analysis of the resulting reaction mixture showed a 27% conversion of methyl 10-undecenoate to a mixture of two products containing about 90% of the straight chain aldehyde, $OHC(CH_2)_{10}COOCH_3$ and 10% of branched aldehyde isomer. Volatiles were removed from the mixture under vacuum, and an infrared spectrum of the residue showed a weak aldehyde band, $\nu_{C-H}$, at ca. 2,750 cm$^{-1}$. The aldehyde band, $\nu_{C=O}$, was obscured by the ester carbonyl band.

EXAMPLES 9-13

These examples are summarized in Table I and illustrate the various cationic hydride catalysts, $L_nMH^+X^-$, that are suitable for use in the hydroformylation of olefins. All reactions were run under 1,500 psig pressure of 1:1 $H_2/CO$ for 2 hours. Product analysis was carried out by glc.

When the silver hexafluorophosphate additive of Example 11 is replaced with sodium bisulfate, sodium acetate, silver hexafluoroantimonate, silver hexachloroantimonate, silver tetrafluoroborate, silver hexachlorostannate, sodium benzene sulfonate, sodium methanesulfonate or sodium trifluoromethanesulfonate, the catalyst with the hexafluorophosphate anion replaced with the corresponding anion, bisulfate, acetate, hexafluoroantimonate, hexachloroantimonate, tetrafluoroborate, hexachlorostannate, $C_6H_5SO_3^-$, $CH_3SO_3^-$ and $CF_3SO_3^-$, respectively, is obtained. Replacement of the trifluoroacetic acid additive of Examples 12 and 13 with sulfuric acid, acetic acid, methanesulfonic acid or trifluoromethanesulfonic acid gives catalysts with, respectively, bisulfate, acetate, $CH_3SO_3^-$ and $CF_3SO_3^-$ anions.

EXAMPLE 14

Following the procedure of Example 1, a mixture of 2 g of 1-hexene, 2 ml of benzene, and 0.10 g of hydridotris(triethylphosphine)platinum(II) hexafluorophosphate was heated at 150° C for 5 hours under 1,500 psig pressure of 1:1 $H_2/CO$. A glc analysis of the resulting reaction mixture showed a 16% conversion of 1-hexene to a mixture of products containing 77% of $C_7$ aldehydes and 23% of $C_7$ alcohols. The $C_7$ aldehydes contained 85% of the linear isomer, n-heptaldehyde, and 15% of the branched isomer, 2-methylhexaldehyde. The $C_7$ alcohols contained essentially 100% of the linear isomer, n-heptanol, with a trace of the branched product.

EXAMPLE 15

Following the procedure of Example 1, a mixture of 2 g of 1-hexene, 2 ml of tetrahydrofuran, and 0.10 g of hydridotris(triethylphosphine)platinum(II) hexafluorophosphate was heated at 150° C for 5 hours under 1,500 psig pressure of 2:1 $H_2/CO$. A glc analysis of the resulting mixture showed a 16% conversion of 1-hexene to give a mixture of products containing 21% $C_7$ aldehydes and 79% of $C_7$ alcohols. The $C_7$ aldehydes contained 73% of the linear isomer, n-heptaldehyde, and 27% of the branched isomer, 2-methylhexaldehyde. The $C_7$ alcohols contained 97% of the linear isomer, n-heptanol, and 3% of the branched isomer, 2-methylhexanol.

When the procedures detailed in the foregoing examples are applied to the unsaturated compounds listed

TABLE I

| Ex. | 1-Hexene (g) | Catalyst (g) | Additive (g) | ml/THF Solvent | Temp. (°C) | % Conver. of 1-Hexene | % $C_7$ Aldehydes Formed[1] | % Linear Isomer[2] | % $C_7$ Alcohols Formed[1] | % Linear Isomer[3] |
|---|---|---|---|---|---|---|---|---|---|---|
| 9 | 2 | $(Et_3P)_3Pth^+PF_6^-$ | — | 3 | 150 | 19 | 91 | 96 | 9 | ca. 100 |
| 10 | 2 | $(Et_3P)_3PtH^+PF_6^-$ | — | 3 | 160 | 21 | 91 | 94 | 9 | ca. 100 |
| 11[4] | 15 | $C_6H_5PdBr[P(C_6H_5)_3]_2$ (0.79) | $AgPF_6$ (0.26) $(C_6H_5)_3P$ (0.27) | 20 | 125 | 4 | 100 | 77 | None detected | — |
| 12[4] | 15 | $[(C_6H_5O)_3P]_4Ni$ (1.3) | $CF_3COOH$ (70 μl) | 20 | 125 | 25 | 100 | 72 | None detected | — |
| 13 | 2 | $[(C_6H_5)_3P]_4Pd$ (0.35) | $CF_3COOH$ (20 μl) | 3 | 125 | 14 | ca. 100 | 82 | Trace | — |

[1] This number represents the $C_7$ of these compounds present in the mixture of aldehydes and alcohols formed in the reaction.
[2] n-Heptaldehyde.
[3] n-Heptanol.
[4] An 80 ml reaction tube was used.

earlier in this specification, one obtains a mixture of hydroformylated products. With terminal olefins the preponderant product is the desired linear aldehyde.

Aldehydes and alcohols preparable by hydroformylation are well known and widely used classes of organic compounds. In certain of these applications, e.g., as intermediates for detergents, it is desirable to have as large a proportion of straight chain to branched chain product as possible. Thus, decyl alcohol can be made by hydroformylation of nonene-1 followed by hydrogenation of the intermediate aldehyde and a very highly linear product is obtained. n-Butyraldehyde, preparable by hydroformylation of propylene, serves as an intermediate for 2-ethylhexanol, a widely used intermediate for plasticizers.

Since obvious modifications and equivalents in the invention will be evident to those skilled in the art, I propose to be bound solely by the appended claims.

The embodiments of the invention in which an exclusive property or privilege is claimed are defined as follows:

1. A process for hydroformylating a compound having at least one active ethylenic group with the provisos:
   i. at least two hydrogen atoms are attached to the unsaturated carbon atoms of each active ethylenic group;
   ii. the active ethylenic groups are not conjugated with other aliphatic unsaturation;
   iii. halogen or hydroxyl, if present are removed by at least two carbon atoms from an active ethylenic group;
   iv. internal active ethylenic groups have the cis configuration; and
   v. the compound is free of amine groups; which comprises contacting the compound with carbon monoxide and hydrogen at a pressure of 1 to 1,000 atmospheres and at a temperature of 25° to 200° C with a catalyst of the formula $L_nMH^+X^-$ wherein $n$ is 2, 3 or 4, M is nickel, palladium or platinum, L is $R_3P$ when R is selected from lower alkyl, aryl of up to 12 carbon atoms, or aryloxy of up to 12 carbon atoms, and X is hexafluorophosphate, bisulfate, acetate, trifluoroacetate, hexafluoroantimonate, hexachloroantimonate, tetrafluoroborate, hexachlorostannate, benzenesulfonate, methanesulfonate or trifluoromethane sulfonate.

2. Process of claim 1 wherein said compound is selected from:

1-alkenes of the formula $H(CH_2)_pCH=CH_2$, wherein $p$ is 0–28, diolefins of the formula $CH_2=CH(CH_2)_qCH=CH_2$, wherein $q$ is 1 to 26, and esters of the formula (lower alkyl)$-OCO(CH_2)_rCH=CH_2$, wherein $r$ is 0 to 21.

3. Process of claim 1 wherein L is triphenylphosphine, tributylphosphine, triethylphosphine or triphenyl phosphite.

4. Process of claim 1 wherein X is hexafluorophosphate, bisulfate or trifluoroacetate.

5. Process of claim 1 wherein M is Pt.

6. Process of claim 5 wherein $L_nMH^+X^-$ is hydridotris(triethylphosphine)platinum(II) hexafluorophosphate.

* * * * *

UNITED STATES PATENT OFFICE
CERTIFICATE OF CORRECTION

PATENT NO. : 3,876,672
DATED : April 8, 1975
INVENTOR(S) : Joseph J. Mrowca

It is certified that error appears in the above-identified patent and that said Letters Patent are hereby corrected as shown below:

Correct the filing date to read February 21, 1973.

Col. 5, line 6 - Add a forward arrow after "HX".

Col. 5, line 6 - Correct the third formula to read "$L_{m-z}MH^{\oplus}X^{\ominus}$".

Col. 9, Example 9 - Under the catalyst column the entry should read "$(Et_3P)_3PtH^+PF_6^-(0.1)$".

Col. 9, Example 10 - Add "(0.1)" after the catalyst entry.

Table I, footnote (1) - Change "$C_7$" to --%--.

Signed and Sealed this second Day of December 1975

[SEAL]

Attest:

RUTH C. MASON
Attesting Officer

C. MARSHALL DANN
Commissioner of Patents and Trademarks